Aug. 11, 1925.
W. R. GRAHAM
VEHICLE DRIVE
Filed June 9, 1921
1,549,534
3 Sheets-Sheet 2
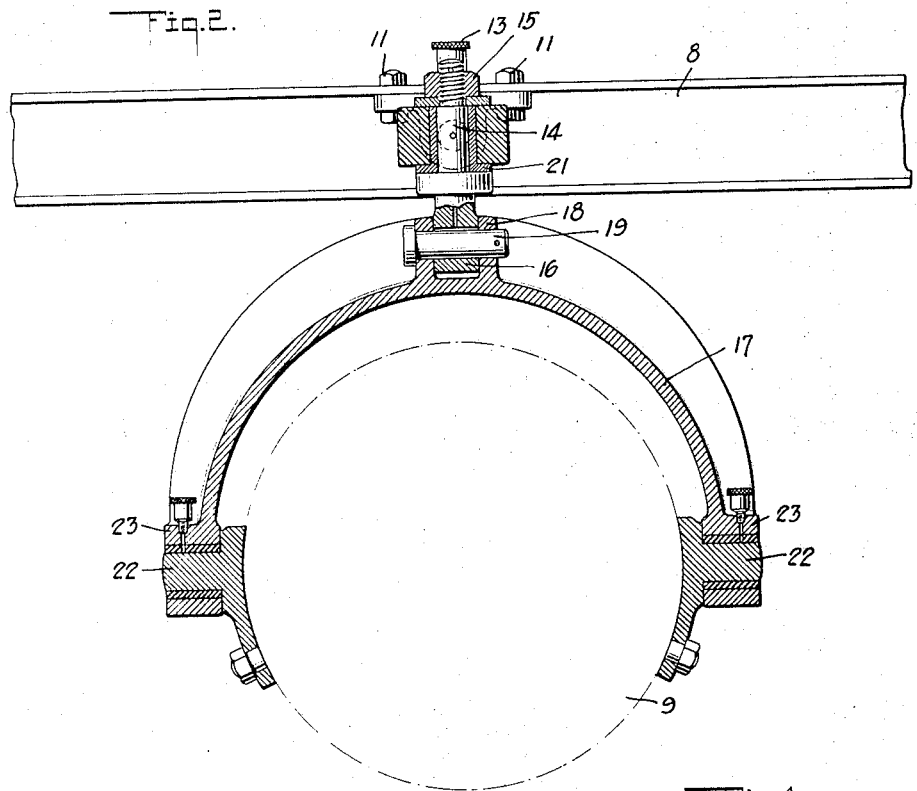
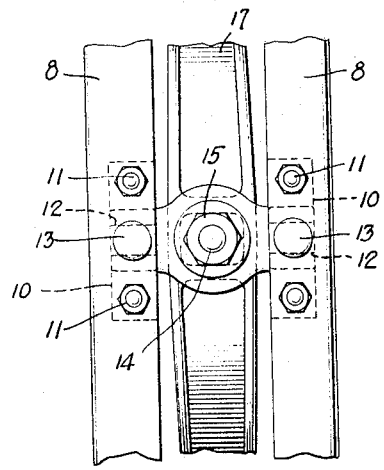
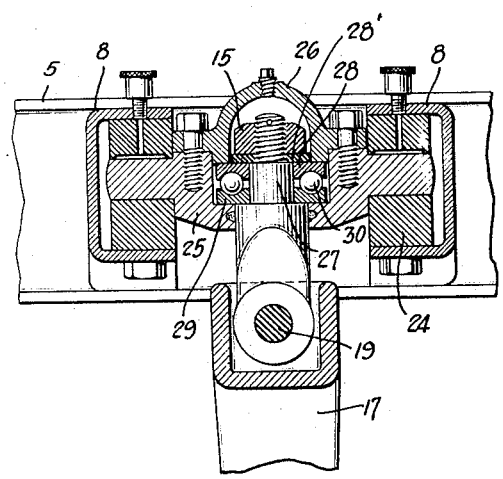
WITNESSES
INVENTOR
W. R. Graham
BY
ATTORNEYS

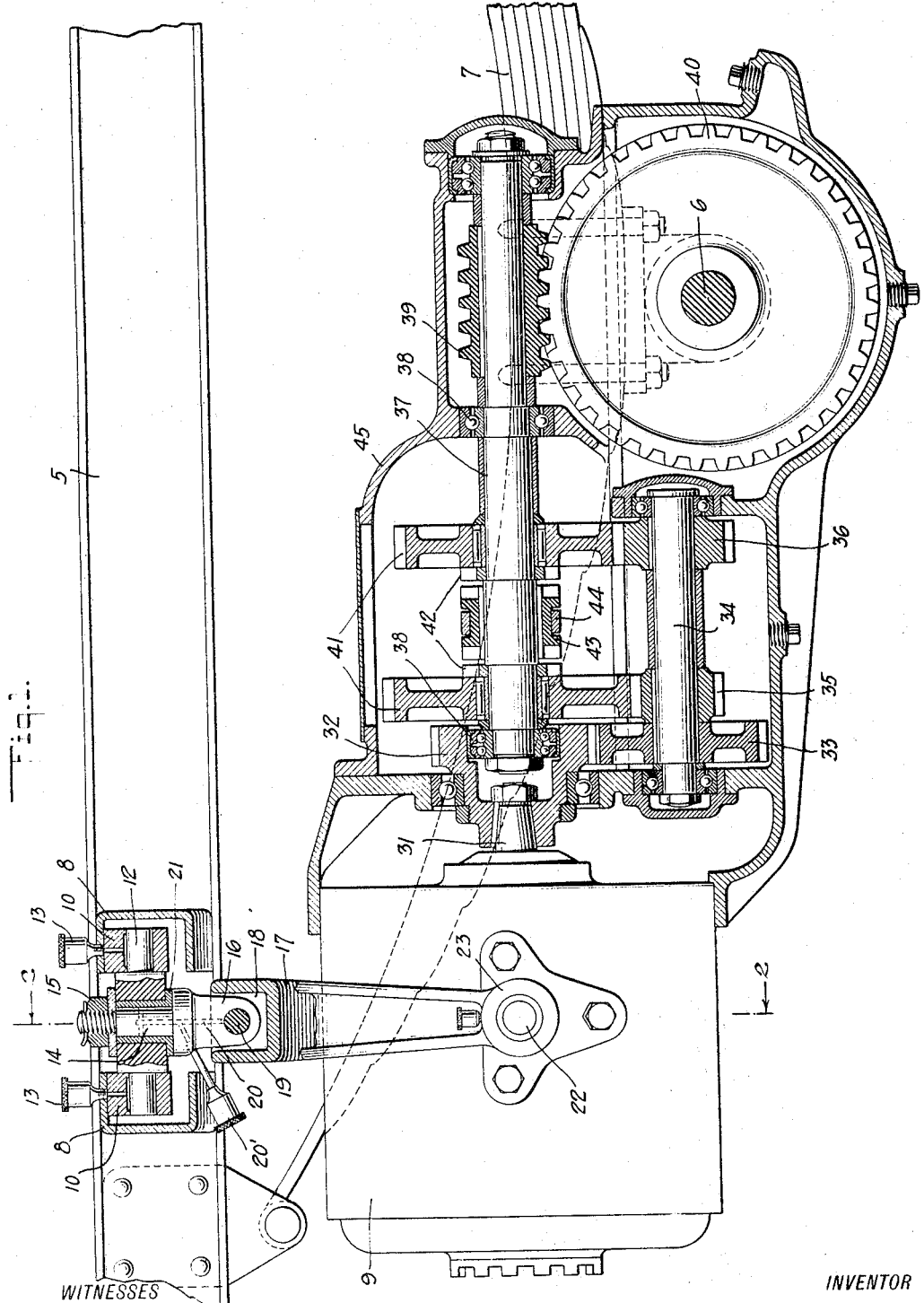

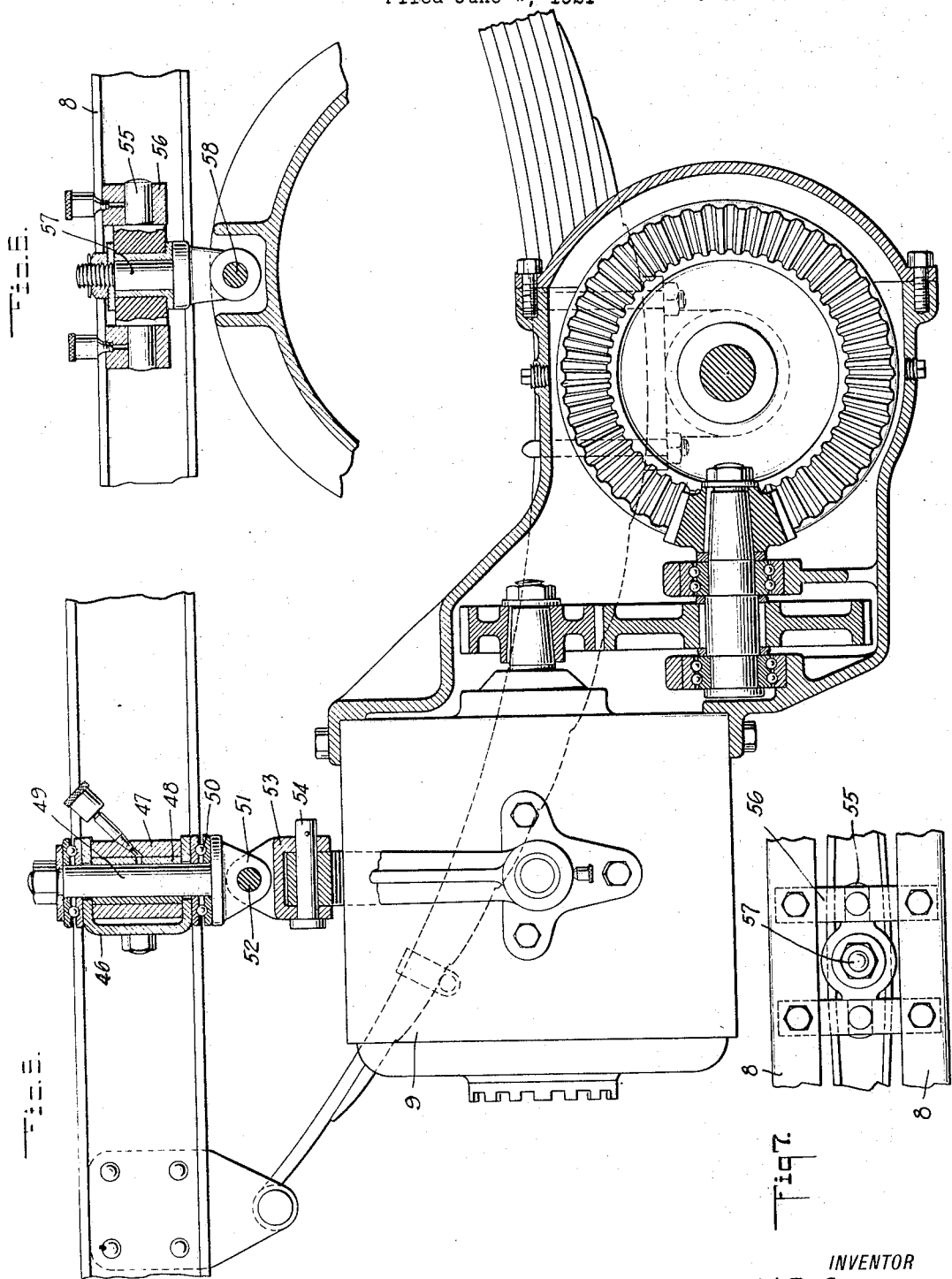

Patented Aug. 11, 1925.

1,549,534

UNITED STATES PATENT OFFICE.

WELLINGTON ROUSE GRAHAM, OF ROSELLE, NEW JERSEY, ASSIGNOR TO JOSEPH L. KOPPERL, OF NEW YORK, N. Y.

VEHICLE DRIVE.

Application filed June 9, 1921. Serial No. 476,270

*To all whom it may concern:*

Be it known that I, WELLINGTON R. GRAHAM, a citizen of the United States, and resident of Roselle, in the county of Union and State of New Jersey, have invented a new and Improved Vehicle Drive, of which the following is a full, clear, and exact description.

My invention relates to a vehicle drive, and aims to provide certain improvements in connection with a device of this character, and more particularly over my prior Patent #1,264,059, dated April 23, 1918.

In connection with the structure presented by this patent, it will be seen that the same employs a universal connection in the nature of a ball and socket member which serves to suspend a yoke, the ends of which co-operate with a saddle.

I have found in practice, that in some instances, a slightly different method of suspension, other than a ball and socket might be utilized. Also it has been found that the saddle is unessential, and that a slightly different form of mounting will permit of the elimination of this element.

Further, it is well appreciated, in connection with an electrically driven truck, that although the conventional controller permits of a wide latitude of power and speed ranges, in some instances difficulty has been experienced particularly where road conditions are extremely unfavorable and the truck is heavily loaded.

With this in view, my present invention aims to provide a slightly modified form of suspension means, which may be used to advantage in certain instances, the saddle being also eliminated by means of my present construction.

Furthermore a slightly more compact unit is presented which will provide means serving to permit the motor meeting all types of road conditions and load, with a maximum efficiency.

Further objects of my invention will appear in the annexed specification and drawings, which latter present one practical embodiment of the same, and in which;

Figure 1 is a partly sectional side view taken through a vehicle constructed in accordance with my invention.

Figure 2 is a sectional view taken along the line 2—2 and in the direction of the arrows indicated in Figure 1.

Figure 3 is a fragmentary plan view of the chassis and showing the same adjacent points of the drive suspension, and Figure 4 is a sectional view similar to Figure 1 but showing a slightly modified form of mounting.

Figure 5 is a view similar to Figure 1 but showing a slightly different form of mounting, Figure 6 is a modified form of Figure 3, and Figure 7 is a view similar to Figure 3 and showing the parts illustrated in Figure 6.

Referring now more particularly to Figure 1, it will be seen that the reference numeral 5 indicates one of the side members of the main frame of the vehicle chassis, below which is suspended any desirable type of rear axle 6, by means of any suitable spring 7.

In lieu of the single cross bar utilized in connection with my prior construction, I now preferably employ a pair of spaced cross bars 8, in the nature of channel members. With a view of providing a suitable type of suspension for the motor enclosed within the casing 9, it will be seen, reference being had to Figures 1 to 3, that a pair of bearing members 10 are associated one with each of the channel members 8, and are preferably attached to the inner faces of the upper arms thereof by means of bolts 11, Figures 2 and 3.

A shaft 12 has its ends rockingly supported one by each of the members 10, and it will be seen that lubricating cups 13 may be associated with these bearing members to prevent any undue amount of wear upon the shaft 12 being rocked.

The center of the shaft 12 is transversely bored to provide an orifice suitable for the reception of a swivel pin 14, retained in this position by means of a nut 15 of any desirable type. The pin 14 is extended to provide an ear 16 adjacent its lower end and below the shaft 12, and a yoke 17 may be provided with a pair of ears 18 lying adjacent to the side faces of the ears 16 and secured in this position by means of a pin 19 to provide a rocking connection between the swivel pin 14 and the yoke 17. In this connection it will also be noted that the swivel pin 14, as well as its ear 16 may be formed with suitable channels 20 permitting of the passage of the lubricating medium supplied preferably by a supplemental cup 20' to allow of an anti-frictional engagement between all of the parts, a bushing 21 encircling the pin 14 and being also adapted for use in this connection.

Thus it will be seen that the yoke 17 is capable of universal movement in that a rocking motion transverse of the chassis is permitted by means of the shaft 12, while a similar movement, longitudinal of the chassis is allowed by the rocking connection afforded by the ears 16 and 18 secured together by the pin 19. Further the swivel pin 14 allows of unlimited rotation of the yoke 17 with respect to the chassis, and thus the universal movement referred to is accomplished.

Now with a view of overcoming the necessity of utilizing a saddle 42 referred to in my previous patent, it will be noted that I accomplish this purpose by simply utilizing relatively heavy trunnions, 22 secured upon opposite sides of the motor casing 9, which trunnions extend through and are supported by lubricated bearings 23 provided adjacent the outer ends of the yoke 17, it being also noted in this connection that the yoke 17 may be formed with a channel member to provide greater rigidity.

Assuming, under certain conditions, particularly where a heavy motor is utilized, that the swivel pin 14 does not rotate with the freedom which is desirable, or that a certain amount of dust works into these portions, it will be seen that this difficulty may be overcome, attention being invited to Figure 4.

In this figure the reference numeral 5 refers to the side member of the chassis, and the reference numerals 8 designate the cross bars, as in Figures 1 to 3. Further bearing members 24 which preferably fill the entire space existent between the arms of the channel cross bars are preferably utilized in this instance. Thus the entrance of dust around these members is guarded against and the shaft 25 is so formed that it is capable of accommodating a cap 26 which entirely encloses the upper end of the swivel pin 27 so that the entrance of any dust at this point is also prevented, aside from the fact that the space existing between the upper end of the swivel pin 27 and the inner face of the cap 26 may be filled in this case with grease.

It will also be noted in this figure, that the nut 15 rests upon the upper face of a washer 28' the lower face of which bears against one half of a ball race, a secondary disk 29 being supported by the shaft 25, and an annular series of balls 30 are interposed between these two disks and thus permits of a ready turning of the swivel pin 27 with respect to the shaft 25, aside from the fact, as aforestated, that the entrance of foreign matter, is effectually guarded against.

Now with a view of overcoming the difficulty mentioned in the preamble of this specification, incident to road conditions being unfavorable, and the truck being overloaded, it will be seen, reference being had to Figure 1, that the motor shaft 31 is keyed to and at all times serves to drive a gear 32 which co-operates with a gear 33 keyed to a transmission shaft 34 which latter also has secured to it, gears 35 and 36 of different diameters.

A propeller shaft 37 is rotatably supported by means of suitable bearings 38, and mounts in its rear end, if required, a suitable type of transmission medium 39 suitably co-operating with the type of ring gear 40 affixed to the axle 6. Also the propeller shaft 37 has a plurality of gears 41 rotatably mounted upon its body, said latter gears being continuously in mesh with the gears 35 and 36. The gears 41 also carry a suitable clutch 42. A collar 43 presenting two clutch faces, is slidably keyed to the propeller shaft 37 between the gears 41, and may be shifted by any suitable means, such as a fork 44.

In normal driving, the collar 43 is shifted so that its rear-most clutch portion engages the clutch part 42 of the rear gear 41. The motor will then drive the gear 32 which in turn will rotate the shaft 34 by means of the gear 33. This rotation will be transmitted to the propeller shaft by virtue of the interengagement of the gear 36 with the rear most gear 41, the motor as aforestated being meshed with the collar 43 keyed to the propeller shaft thus driving the axle 6. Assuming however that an excess of power is desired due to the conditions aforementioned, it will be appreciated that the collar 43 may be shifted so as to engage the clutch 42 of the innermost gear 41. In this instance a drive will be effected from the motor shaft 31 through the gear 32 to the transmission shaft 34 by means of the gear 33, and in turn to the propeller shaft 37 by virtue of the gear 35 co-operating with the innermost gear 41 engaged by the collar 43.

Thus a multiple power range will be obtained which will permit the operator of the vehicle to meet all road conditions which he may encounter, and to be capable of operating a vehicle in such a manner that no danger of the parts being strained will exist.

Referring now more particularly to the construction illustrated in Figure 5 which may be utilized to advantage in certain adaptations, it will be seen that all of the parts are of similar construction to the apparatus as aforedescribed, with the exception that but a single cross piece 46 is utilized. Also by virtue of the fact that the swivel pin hereinafter more fully described is not capable of a rocking action, but only a rotation.

Thus a suitable bracing block 47 may be disposed between the arms of the cross bar 46 and the sleeve 48 may also be arranged between these arms, and serve to encircle and lubricate the swivel pin 49. This latter is placed in a state of suspension to permit of its free rotation by any suitable type of bearings such as two annular series of balls 50 which are preferably disposed at points beyond the outer faces of the arms of the cross bar 46, and are retained in this position in the usual manner.

To now compensate for the loss of rocking motion on the part of the swivel pin, and to permit of this motion on the part of the motor casing 9 it will be seen that the swivel pin terminates, as in Figure 5 in an ear 51, and that a pin 52 extends through this ear and rockingly supports a clevis member 53, the latter in turn carrying a pin 54 extending transversely to the pin 52, and extending through a suitable type of yoke 17.

Thus the motor casing 9 may rock transversely or longitudinally of the chassis, and an oscillation of the motor casing in a horizontal plan will obviously be permitted by means of the swivel pin 49.

Finally with reference to the structure illustrated in Figure 6 it will be seen, as in Figure 3, that a shaft 55 is mounted in bearings 56 and that this shaft carries a swivel pin 57. However, contrary to Figs. 2–3, in which the shaft extends transversely of the cross bars 8 it will be seen that in Figure 6, the shaft lies parallel to these members. Thus the shaft 55 allows longitudinal rocking while transverse rocking between the yoke and swivel pin 57 is permitted by means of the pivotal connection 58, the swivel pin allowing, in the usual manner a certain amount of oscillation on the part of the motor casing 9, shown in Figure 2.

It will be seen that a transmission case 45 extends between and is rigidly secured to both the motor casing 9 and the rear axle casing, whereby a single integral unit will be presented which will incorporate the driving and driven elements, as well as of intermediate mechanism.

I have thus constructed a form of vehicle drive which will present certain improvements over my prior patent in that the entire structure is simplified and improved as has been pointed out in the preamble of this specification, and also optional forms of suspension are provided which will allow for the adaptation of the drive to any desirable type of vehicle. It will readily be appreciated that any suitable type of gearing may be utilized. Thus the gearing shown in connection with Figure 1 may be substituted for the gearing illustrated in Figure 5 or vice versa, as may be desired.

Obviously numerous modifications of structure might readily be resorted to without in the least departing from the spirit of my invention, which I claim as;

1. In a vehicle drive mounting, a chassis frame, a shaft, means for rockingly securing said shaft to said chassis frame, a swivel pin rotatably secured to said shaft, and a yoke rockingly secured to the lower end of said swivel pin.

2. In a vehicle drive mounting, a chassis frame, a shaft, means for rockingly securing said shaft to said frame, said shaft extending longitudinally of said chassis, a swivel pin rotatably secured to said shaft, and a yoke rockingly secured to the lower end of said swivel pin.

3. In a vehicle drive mounting, a chassis frame including side members, cross bars comprising channel members extending between said members forming a part of said chassis frame, bearing elements associated with each of said cross bars, and between the inner faces of the arms thereof, a shaft having its ends extending into said bearing elements, said shaft being formed with a bore extending transversely of the same, a swivel pin mounted within said bore, and means for suspending a motor from said swivel pin.

4. In a vehicle drive mounting, a pin, means in which said pin is swivelly mounted for rotatably connecting said pin to the chassis of a vehicle, an ear forming the lower part of said pin, a yoke, an ear forming a part of said yoke and adapted to lie adjacent said first named ear, and a pin extending through both of said ears.

5. In a vehicle drive mounting, a shaft, means for rockingly supporting said shaft, a swivel pin having its upper end extending through a transverse bore in said shaft and a cap secured to said shaft and enclosing the upper end of said swivel pin.

6. In a vehicle drive mounting, a shaft, means for rockingly supporting said shaft, a swivel pin having its upper end extending through a transverse bore in said shaft, and a pair of members constituting a bearing race, one of said members being secured to said pin, and bearings interposed between said members.

7. In a vehicle drive mounting, a chassis frame, a swivel pin rockingly supported by said frame, and vehicle driving means rockingly supported by said swivel pin directly below said swivel pin.

8. In a vehicle drive mounting, a chassis frame, a swivel pin rotatably supported by said frame, and a yoke swingingly attached to said swivel pin directly below the same and capable of universal movement with respect to said frame.

9. In a vehicle drive mounting, a chassis frame, cross bars extending between the longitudinal side members of said frame, bearings secured to said bars a shaft having rocking engagement with said bearings, a swivel pin rotatably carried by said shaft, and a yoke pivoted to said pin.

10. In a vehicle drive mounting, a chassis frame, cross bars extending between the longitudinal side members of said frame, bearings secured to said cross bars, a shaft movably supported in said bearings, a swivel pin rotatably carried by said shaft, and means for securing a motor to said pin.

11. In a vehicle drive mounting, a chassis frame, cross bars extending between the side members of said frame, bearings carried by said cross bars, a shaft engaging said bearings a swivel pin carried by said shaft and extending transversely thereto, and means for suspending a motor from said swivel pin.

12. In motor vehicle construction, in combination, an electric motor, supporting means straddling said motor and pivotally connected thereto adjacent its sides, a supporting device pivotally connected with said first supporting means to permit relative swinging about an axis substantially parallel with that of said first pivotal connection, and a member mounted on the frame of the vehicle to swing about a substantially horizontal axis transverse to said first axis and having secured thereto to swing about a vertical axis said supporting device.

13. In motor vehicle construction, in combination, an electric motor, supporting means straddling said motor and pivotally connected therewith at its sides, a supporting device pivotally connected with said first supporting means to permit relative swinging about an axis substantially parallel with that of said first pivotal connection, and a member mounted on the frame of the vehicle to swing about a substantially horizonal axis transverse to said first axis and having secured thereto to swing about a vertical axis said supporting device, the pivotal connection of said first supporting means with said motor comprising a pair of trunnion plates secured to opposite sides of the motor casing.

WELLINGTON ROUSE GRAHAM.